(12) United States Patent
Geiser et al.

(10) Patent No.: US 11,661,979 B2
(45) Date of Patent: May 30, 2023

(54) DOG CLUTCH WITH RATCHETING ONE-WAY CLUTCH

(71) Applicant: Schaeffler Technologies AG & Co. KG, Herzogenaurach (DE)

(72) Inventors: Jordan Geiser, Massillon, OH (US); Carsten Behler, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 23 days.

(21) Appl. No.: 17/343,131

(22) Filed: Jun. 9, 2021

(65) Prior Publication Data

US 2022/0397164 A1 Dec. 15, 2022

(51) Int. Cl.
*F16D 41/04* (2006.01)
*F16D 41/12* (2006.01)
*F16D 11/10* (2006.01)

(52) U.S. Cl.
CPC .............. *F16D 41/04* (2013.01); *F16D 11/10* (2013.01); *F16D 41/12* (2013.01); *F16D 41/125* (2013.01); *F16D 2300/12* (2013.01); *F16D 2300/26* (2013.01)

(58) Field of Classification Search
CPC ........ F16D 41/04; F16D 41/12; F16D 41/125; F16D 11/08; F16D 11/10; F16D 11/14; F16D 47/04
See application file for complete search history.

(56) References Cited

U.S. PATENT DOCUMENTS

| 5,597,057 | A | | 1/1997 | Ruth et al. |
| 5,971,122 | A | * | 10/1999 | Costin ..................... F16D 41/12 192/103 B |
| 6,125,979 | A | * | 10/2000 | Costin ..................... F16D 41/14 192/103 B |
| 7,100,756 | B2 | * | 9/2006 | Kimes ..................... F16D 41/12 192/69.1 |
| 7,101,301 | B2 | | 9/2006 | Haka |
| 7,694,793 | B2 | | 4/2010 | Wittkopp et al. |
| 9,011,289 | B2 | | 4/2015 | Goleski et al. |
| 2006/0021838 | A1 | | 2/2006 | Kimes et al. |
| 2008/0185253 | A1 | | 8/2008 | Kimes et al. |
| 2017/0023074 | A1 | | 1/2017 | Rivera |
| 2018/0266502 | A1 | | 9/2018 | Shioiri et al. |

FOREIGN PATENT DOCUMENTS

GB 679161 A * 9/1952
KR 101428421 B1 8/2014

* cited by examiner

*Primary Examiner* — Richard M Lorence

(57) ABSTRACT

A dog clutch with ratcheting one-way clutch includes an axis, a dog clutch ring, a first ring, a second ring, and a plurality of rockers. The dog clutch ring has a plurality of first teeth. The first ring includes a plurality of second teeth, complementary to the first teeth, a first spline for receiving a first shaft, and a plurality of first pockets. The second ring includes a plurality of third teeth, complementary to the first teeth, a second spline for receiving a second shaft, and a plurality of second pockets. The plurality of rockers is disposed in a one of the plurality of first pockets or the plurality of second pockets for selectively engaging with the other one of the plurality of first pockets or the plurality of second pockets to prevent rotation of the first ring relative to the second ring in only one rotational direction.

18 Claims, 3 Drawing Sheets

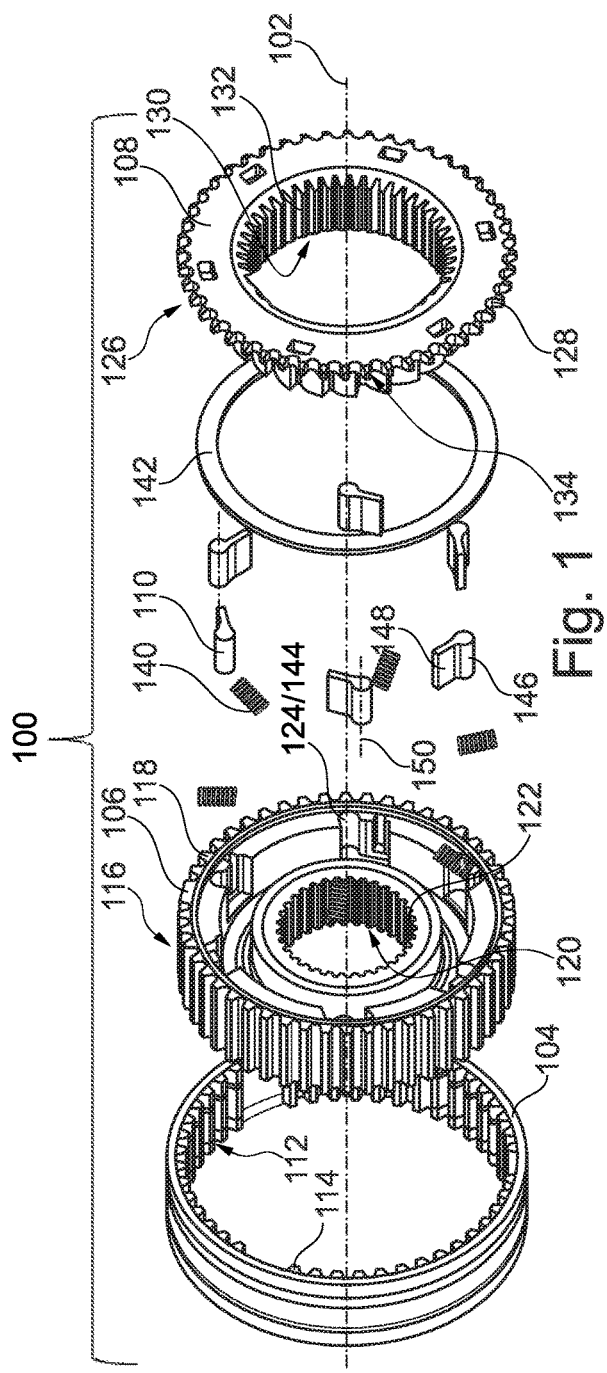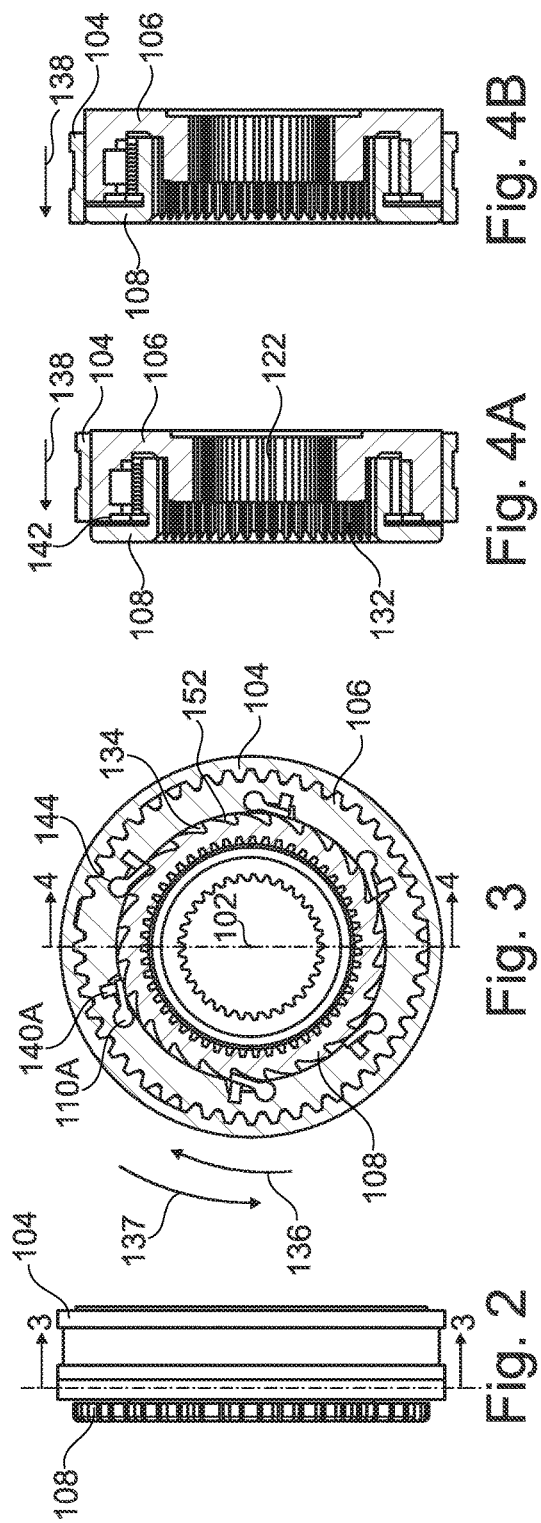

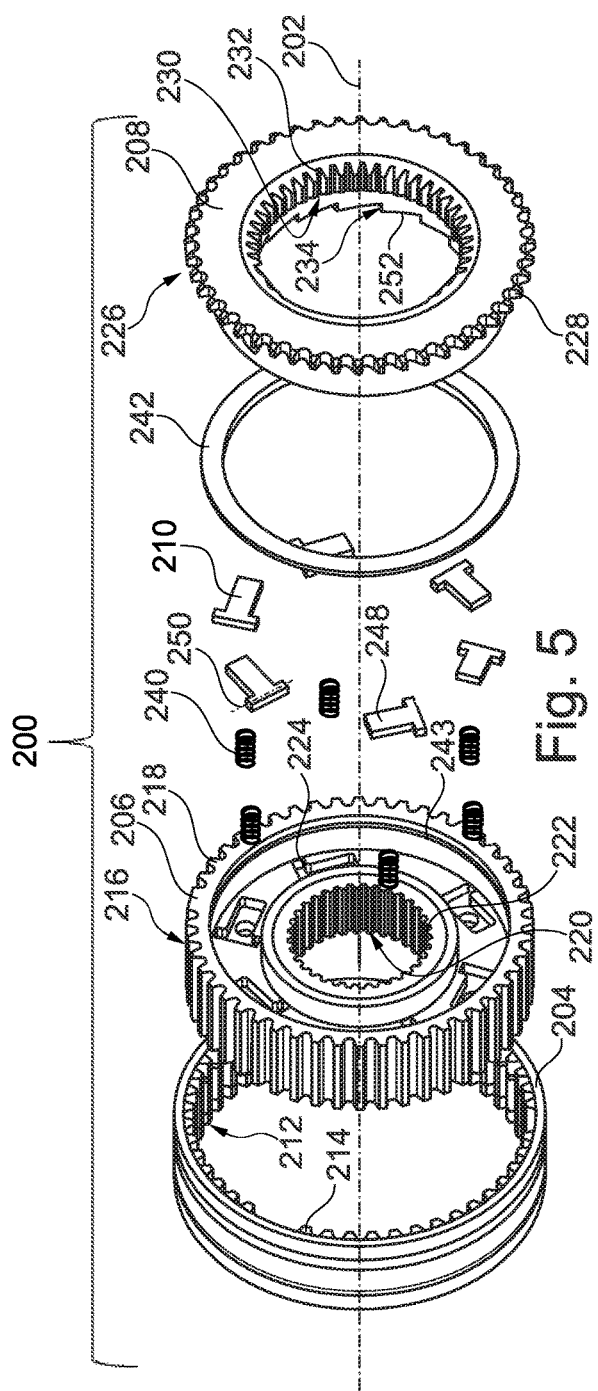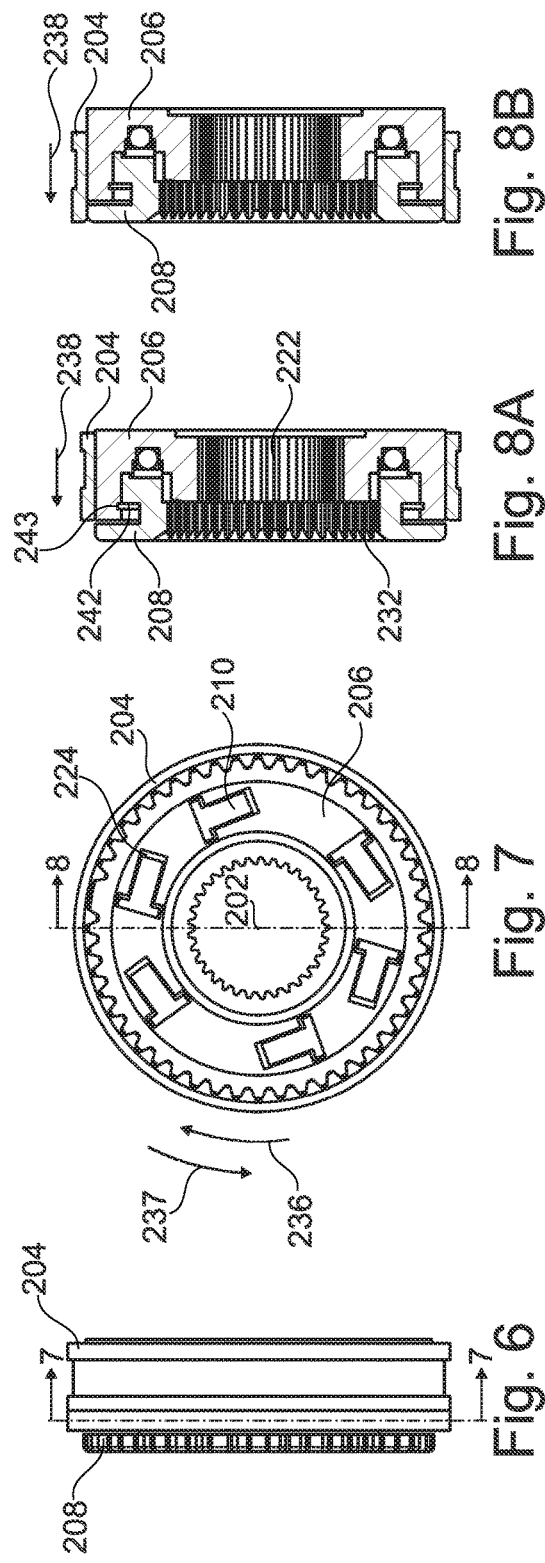

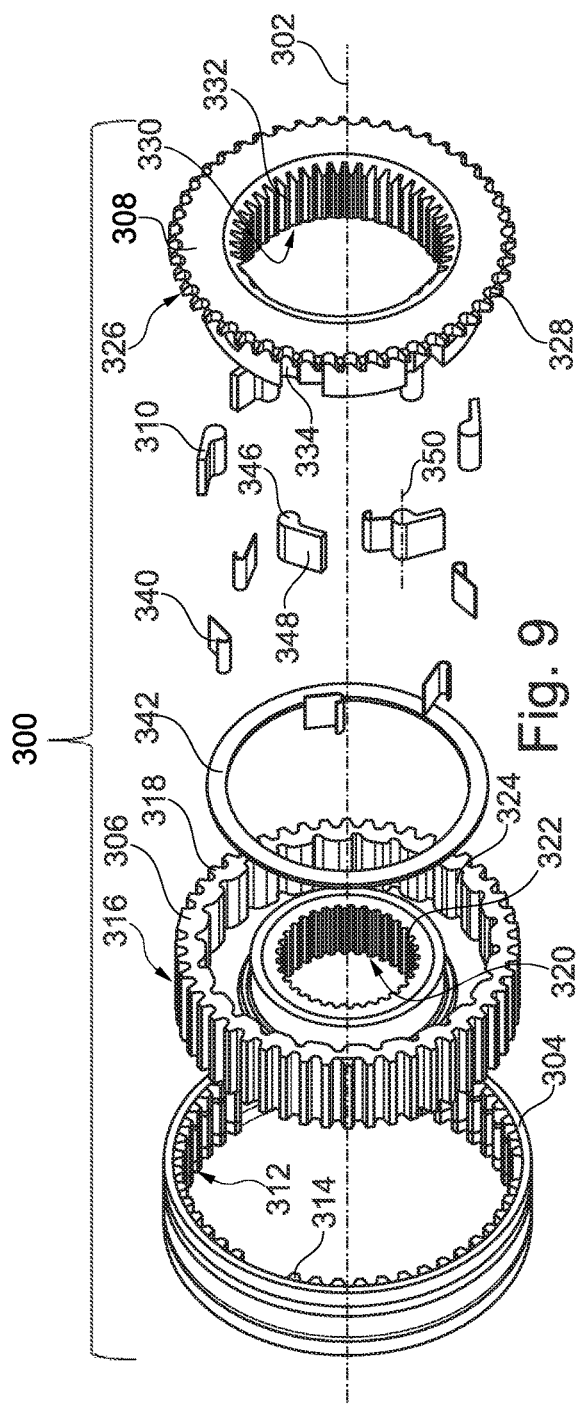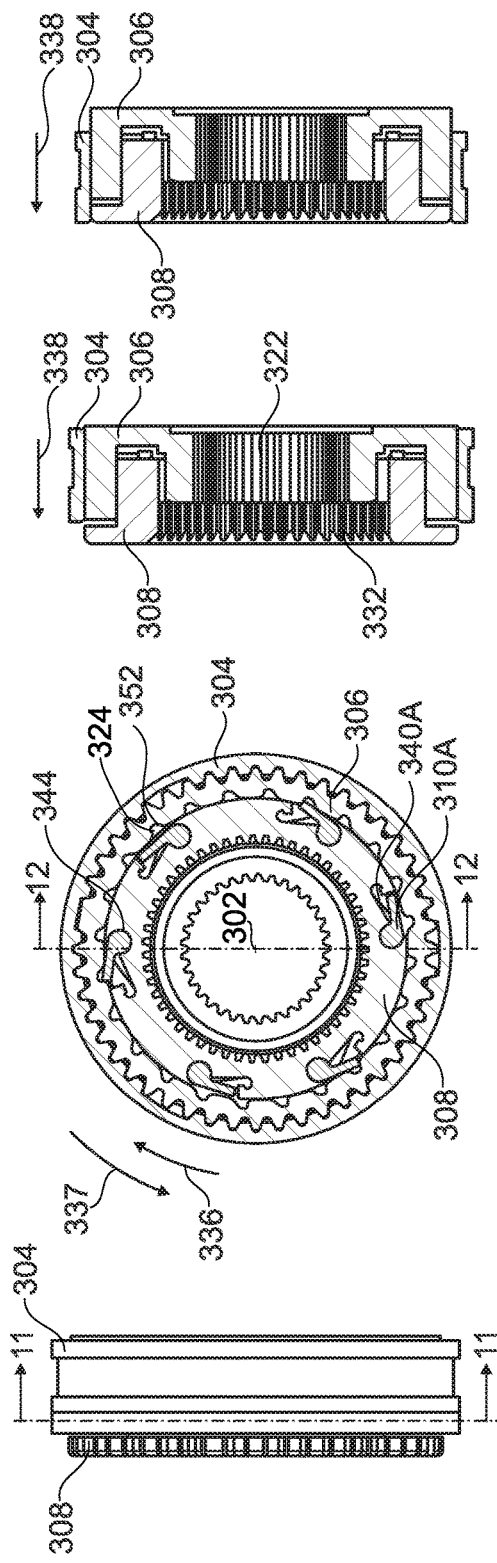

DOG CLUTCH WITH RATCHETING ONE-WAY CLUTCH

TECHNICAL FIELD

The present disclosure relates generally to a dog clutch, and more specifically to a dog clutch with a ratcheting one-way clutch.

BACKGROUND

Dog clutches and one-way clutches are known. Examples are shown in U.S. Pat. No. 7,101,301 to Haka for a TWO-SPEED TRANSFER CASE WITH CENTER DIFFERENTIAL, teaching a clutching arrangement including a one-way clutch and a dog clutch in parallel; U.S. Pat. No. 7,694,793 to Wittkopp et al. for a ONE-WAY CLUTCH WITH DOG-CLUTCH AND SYNCHRONIZER, teaching an integrated one-way clutch, dog clutch apply plate. and synchronizer clutch; U.S. Pat. No. 9,011,289 to Goleski et al. for a TRANSMISSION CLUTCH ASSEMBLY, teaching a clutch assembly that combines a positively engaging dog clutch and one way clutch; and U.S. Pat. No. 5,597,057 to Ruth et al. for a ONE-WAY CLUTCH APPARATUS, teaching a one-way clutch apparatus with a driving member having recesses, biasing members disposed in the recesses, keys or struts disposed over the biasing members, and a driven member having key-engaging notches, for example

SUMMARY

Example embodiments broadly comprise a dog clutch with ratcheting one-way clutch, including an axis, a dog clutch ring, a first ring, a second ring, and a plurality of rockers. The dog clutch ring has a first inner circumference with a plurality of first teeth. The first ring is coaxial with the dog clutch ring and includes a first outer circumference with a plurality of second teeth, complementary to the first teeth, a second inner circumference with a first spline for receiving a first shaft, and a plurality of first pockets. The second ring is coaxial with the dog clutch ring and includes a second outer circumference with a plurality of third teeth, complementary to the first teeth, a third inner circumference with a second spline for receiving a second shaft, and a plurality of second pockets. The plurality of rockers is disposed in a one of the plurality of first pockets or the plurality of second pockets for selectively engaging with the other one of the plurality of first pockets or the plurality of second pockets to prevent rotation of the first ring relative to the second ring in only one rotational direction.

In an example embodiment, the plurality of first teeth is engaged with the plurality of second teeth, and axial displacement of the dog clutch ring relative to the second ring engages the plurality of first teeth with the plurality of third teeth to lock the first ring, the second ring, and the dog clutch ring together for cojoint rotation. In some example embodiments, the dog clutch with ratcheting one-way clutch also includes a plurality of springs. Each one of the plurality of springs is arranged to urge a one of the plurality of rockers into engagement with a one of the other one of the plurality of first pockets or the plurality of second pockets. In an example embodiment, rotation of the first ring relative to the second ring in a second rotational direction, opposite the only one rotational direction, displaces the plurality of rockers to compress the springs.

In some example embodiments, the dog clutch with ratcheting one-way clutch also includes a cover, fixed to a one of the first ring or the second ring, to axially retain the plurality of rockers in the one of the first ring or the second ring. In an example embodiment, the cover is fixed to the one of the first ring or the second ring by press-fitting or staking. In an example embodiment, the cover is a snap ring disposed in a groove of the one of the first ring or the second ring.

In some example embodiments, the plurality of rockers is disposed in the plurality of first pockets. In some example embodiments, each one of the plurality of first pockets has a first cylindrical surface, and each one of the plurality of rockers has a second cylindrical surface contacting one of the first cylindrical surfaces, and a first protrusion extending radially outward from the second cylindrical surface and arranged for selectively engaging one of the plurality of second pockets. In some example embodiments, each one of the plurality of rockers is arranged to rotate about a respective rocker axis, parallel to the axis, to engage one of the plurality of second pockets. In an example embodiment, each one of the plurality of second pockets has a radially extending ramp.

In some example embodiments, each one of the plurality of first pockets has a T-shaped pocket, each one of the plurality of rockers has a T-shape and is arranged to fit within one of the T-shaped pockets, and the T-shape has a circumferentially extending base portion arranged for selectively engaging one of the plurality of second pockets. In some example embodiments, each one of the plurality of rockers is arranged to rotate about a respective rocker axis, normal to the axis, to engage one of the plurality of second pockets. In an example embodiment, each one of the plurality of second pockets has a circumferentially extending ramp.

In some example embodiments, the plurality of rockers is disposed in the plurality of second pockets. In some example embodiments, each one of the plurality of second pockets has a third cylindrical surface, and each one of the plurality of rockers has a fourth cylindrical surface contacting one of the third cylindrical surfaces, and a second protrusion extending radially outward from the fourth cylindrical surface and arranged for selectively engaging one of the plurality of first pockets. In an example embodiment, each one of the plurality of rockers is arranged to rotate about a respective rocker axis, parallel to the axis, to engage a one of the plurality of first pockets. In an example embodiment, each one of the plurality of first pockets has a radially extending ramp.

BRIEF DESCRIPTION OF THE DRAWINGS

FIG. 1 illustrates a perspective exploded view of a dog clutch with ratcheting one-way clutch according to an example embodiment.

FIG. 2 illustrates a side view of the dog clutch with ratcheting one-way clutch of FIG. 1.

FIG. 3 illustrates a cross-sectional view of the dog clutch with ratcheting one-way clutch of FIG. 1 taken generally along line 3-3 of FIG. 2.

FIG. 4A illustrates a cross-sectional view of the dog clutch with ratcheting one-way clutch of FIG. 1 taken generally along line 4-4 of FIG. 3 showing the dog clutch in a disengaged position.

FIG. 4B illustrates a cross-sectional view of the dog clutch with ratcheting one-way clutch of FIG. 1 taken generally along line 4-4 of FIG. 3 showing the dog clutch in an engaged position.

FIG. 5 illustrates a perspective exploded view of a dog clutch with ratcheting one-way clutch according to an example embodiment.

FIG. 6 illustrates a side view of the dog clutch with ratcheting one-way clutch of FIG. 5.

FIG. 7 illustrates an end view of the dog clutch with ratcheting one-way clutch of FIG. 5 with a second ring removed for clarity.

FIG. 8A illustrates a cross-sectional view of the dog clutch with ratcheting one-way clutch of FIG. 5 taken generally along line 8-8 of FIG. 7 showing the dog clutch in a disengaged position.

FIG. 8B illustrates a cross-sectional view of the dog clutch with ratcheting one-way clutch of FIG. 5 taken generally along line 8-8 of FIG. 7 showing the dog clutch in an engaged position.

FIG. 9 illustrates a perspective exploded view of a dog clutch with ratcheting one-way clutch according to an example embodiment.

FIG. 10 illustrates a side view of the dog clutch with ratcheting one-way clutch of FIG. 9.

FIG. 11 illustrates a cross-sectional view of the dog clutch with ratcheting one-way clutch of FIG. 9 taken generally along line 11-11 of FIG. 10.

FIG. 12A illustrates a cross-sectional view of the dog clutch with ratcheting one-way clutch of FIG. 9 taken generally along line 12-12 of FIG. 11 showing the dog clutch in a disengaged position.

FIG. 12B illustrates a cross-sectional view of the dog clutch with ratcheting one-way clutch of FIG. 9 taken generally along line 12-12 of FIG. 3 showing the dog clutch in an engaged position.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to FIGS. 1-4B. FIG. 1 illustrates a perspective exploded view of dog clutch with ratcheting one-way clutch 100 according to an example embodiment. FIG. 2 illustrates a side view of the dog clutch with ratcheting one-way clutch of FIG. 1. FIG. 3 illustrates a cross-sectional view of the dog clutch with ratcheting one-way clutch of FIG. 1 taken generally along line 3-3 of FIG. 2. FIG. 4A illustrates a cross-sectional view of the dog clutch with ratcheting one-way clutch of FIG. 1 taken generally along line 4-4 of FIG. 3 showing the dog clutch in a disengaged position. FIG. 4B illustrates a cross-sectional view of the dog clutch with ratcheting one-way clutch of FIG. 1 taken generally along line 4-4 of FIG. 3 showing the dog clutch in an engaged position.

Dog clutch with ratcheting one-way clutch 100 includes axis 102, dog clutch ring 104, rings 106 and 108, coaxial with the dog clutch ring, and rockers 110. The dog clutch ring has an inner circumference 112 with teeth 114 and ring 106 has outer circumference 116 with teeth 118 complementary to teeth 114. By complementary to, we mean that teeth 114 and 118 are so designed as to be matingly engaged when rings 104 and 106 are axially aligned (i.e., occupy a same space in the axial direction). Device 100 may have different numbers of teeth 114 and 118, however. Ring 106 also includes inner circumference 120 with spline 122 for receiving a first shaft (not shown), and pockets 124. Ring 108 includes outer circumference 126 with teeth 128, complementary to teeth 114, inner circumference 130 with spline 132 for receiving a second shaft (not shown), and pockets 134. As will be described in more detail below, rockers 110 are disposed in pockets 124 for selectively engaging pockets 134 to prevent rotation of ring 106 relative to ring 108 in rotational direction 136. Ring 106 is rotatable relative to ring 108 in rotational direction 137, opposite rotational direction 136.

Teeth 114 are engaged with teeth 118. Axial displacement of the dog clutch ring relative to ring 108 in axial direction 138 (ref FIGS. 4A and 4B) engages teeth 114 with teeth 128 to lock rings 106 and 108, and the dog clutch ring together for cojoint rotation. Dog clutch with ratcheting one-way clutch 100 also includes springs 140. Each spring is arranged to urge a rocker into engagement with a pocket 134.

As can be seen in FIG. 3, for example, rotation of ring 106 relative to ring 108 in rotational direction 137 displaces the rockers (e.g., rocker 110A) to compress the springs (e.g., spring 140A). Therefore, rotation in direction 137 allows the rockers to slide in and out of engagement with pockets 134 but does not prevent rotation of ring 106 relative to ring 108, however. Conversely, due to the construction of pockets 134, when ring 106 is rotated in direction 136, the springs push the rockers into the pockets so that, once at least one rocker is fitted in a pocket, ring 106 is prevented from further rotating relative to ring 108. It should be noted that only one rocker need be disposed in a pocket 134 to prevent rotation and that rotational distribution of the rockers and a number of pockets 134 can be adjusted to limit an amount of rotation in direction 136 before a rocker is fully seated in a pocket 134.

Dog clutch with ratcheting one-way clutch 100 includes cover 142, fixed to ring 106 to axially retain the rockers in ring 106. Cover 142 may be fixed to ring 106 by press-fitting or staking, for example. Pockets 124 include cylindrical surfaces 144 and rockers include cylindrical surfaces 146 contacting surfaces 144 and protrusions 148 extending radially outward from surfaces 146 and arranged for selectively engaging pockets 134. Rockers 110 are arranged to rotate about respective rocker axes 150, parallel to axis 102, to engage pockets 134. As can best be seen in FIG. 3, pockets 134 each includes a radially extending ramp 152. By radially extending, we mean that the ramp extends at least partially radially inward in rotational direction 136 (or radially outward in rotational direction 137), for example.

During operation, a one-way clutch portion of the dog clutch with ratcheting one-way clutch prevents rotation in one direction. That is, rotation of ring 106 relative to ring 108 in rotational direction 136 locks the rings together and aligns teeth 118 and 128 so that the dog clutch ring (already aligned with teeth 118) easily moves in axial direction 138 to engage teeth 114 and 128. The dog clutch ring may be displaceable by an actuator (not shown), for example. In other words, the one-way clutch portion holds torque and aligns the teeth while the dog clutch portion is engaged, making for an easy transition without the need for additional synchronization, thereby reducing shift time. As discussed above, once the dog clutch portion is engaged, device 100 transmits torque in rotational direction 137 as well as rotational direction 136.

The following description is made with reference to FIGS. 5-8B. FIG. 5 illustrates a perspective exploded view of dog clutch with ratcheting one-way clutch 200 according to an example embodiment. FIG. 6 illustrates a side view of the dog clutch with ratcheting one-way clutch of FIG. 5. FIG. 7 illustrates a cross-sectional view of the dog clutch with ratcheting one-way clutch of FIG. 5 taken generally along line 7-7 of FIG. 6. FIG. 8A illustrates a cross-sectional view of the dog clutch with ratcheting one-way clutch of FIG. 5 taken generally along line 8-8 of FIG. 7 showing the dog clutch in a disengaged position. FIG. 8B illustrates a cross-sectional view of the dog clutch with ratcheting one-way clutch of FIG. 5 taken generally along line 8-8 of FIG. 7 showing the dog clutch in an engaged position.

Dog clutch with ratcheting one-way clutch 200 includes axis 202, dog clutch ring 204, rings 206 and 208, coaxial with the dog clutch ring, and rockers 210. The dog clutch ring has an inner circumference 212 with teeth 214 and ring 206 has outer circumference 216 with teeth 218 complementary to teeth 214. By complementary to, we mean that teeth 214 and 218 are so designed as to be matingly engaged when rings 204 and 206 are axially aligned (i.e., occupy a same space in the axial direction). Device 200 may have different numbers of teeth 214 and 218, however. Ring 206 also includes inner circumference 220 with spline 222 for receiving a first shaft (not shown), and pockets 224. Ring 208 includes outer circumference 226 with teeth 228, complementary to teeth 214, inner circumference 230 with spline 232 for receiving a second shaft (not shown), and pockets 234. As will be described in more detail below, rockers 210 are disposed in pockets 224 for selectively engaging pockets 234 to prevent rotation of ring 206 relative to ring 208 in rotational direction 236. Ring 206 is rotatable relative to ring 208 in rotational direction 237, opposite rotational direction 236.

Teeth 214 are engaged with teeth 218. Axial displacement of the dog clutch ring relative to ring 208 in axial direction 238 (ref. FIGS. 8A and 8B) engages teeth 214 with teeth 228 to lock rings 206 and 208, and the dog clutch ring together for cojoint rotation. Dog clutch with ratcheting one-way clutch 200 also includes springs 240. Each spring is arranged to urge a rocker into engagement with a pocket 234.

Rotation of ring 206 relative to ring 208 in rotational direction 237 displaces the rockers to compress the springs. Therefore, rotation in direction 237 allows the rockers to slide in and out of engagement with pockets 234 but does not prevent rotation of ring 206 relative to ring 208, however. Conversely, due to the construction of pockets 234, when ring 206 is rotated in direction 236, the springs push the rockers into the pockets so that, once at least one rocker is fitted in a pocket, ring 206 is prevented from further rotating relative to ring 208. It should be noted that only one rocker need be disposed in a pocket 234 to prevent rotation and that rotational distribution of the rockers and a number of pockets 234 can be adjusted to limit an amount of rotation in direction 236 before a rocker is fully seated in a pocket 234.

Dog clutch with ratcheting one-way clutch 200 includes cover 242, fixed to ring 206 to axially retain the rockers in ring 206. Cover 242 is a snap ring disposed in groove 243 of ring 206. Pockets 224 are T-shaped pockets and rockers are T-shaped to fit within the T-shaped pockets. The T-shaped rockers include circumferentially extending base-portions 248 arranged for selectively engaging pockets 234. Rockers 210 are arranged to rotate about respective rocker axes 250, normal to axis 202, to engage pockets 234. As can best be seen in FIG. 5, pockets 234 each includes an axially extending ramp 252. By axially extending, we mean that the ramp extends at least partially axially outward in rotational direction 236 (or axially inward in rotational direction 237), for example.

The following description is made with reference to FIGS. 9-12B. FIG. 9 illustrates a perspective exploded view of dog clutch with ratcheting one-way clutch 300 according to an example embodiment. FIG. 10 illustrates a side view of the dog clutch with ratcheting one-way clutch of FIG. 9. FIG. 11 illustrates a cross-sectional view of the dog clutch with ratcheting one-way clutch of FIG. 9 taken generally along line 11-11 of FIG. 10. FIG. 12A illustrates a cross-sectional view of the dog clutch with ratcheting one-way clutch of FIG. 9 taken generally along line 12-12 of FIG. 11 showing the dog clutch in a disengaged position. FIG. 12B illustrates a cross-sectional view of the dog clutch with ratcheting one-way clutch of FIG. 9 taken generally along line 12-12 of FIG. 11 showing the dog clutch in an engaged position.

Dog clutch with ratcheting one-way clutch 300 includes axis 302, dog clutch ring 304, rings 306 and 308, coaxial with the dog clutch ring, and rockers 310. The dog clutch ring has an inner circumference 312 with teeth 314 and ring 306 has outer circumference 316 with teeth 318 complementary to teeth 314. By complementary to, we mean that teeth 314 and 318 are so designed as to be matingly engaged when rings 304 and 306 are axially aligned (i.e., occupy a same space in the axial direction). Device 300 may have different numbers of teeth 314 and 318, however. Ring 306 also includes inner circumference 320 with spline 322 for receiving a first shaft (not shown), and pockets 324. Ring 308 includes outer circumference 326 with teeth 328, complementary to teeth 314, inner circumference 330 with spline 332 for receiving a second shaft (not shown), and pockets 334. As will be described in more detail below, rockers 310 are disposed in pockets 334 for selectively engaging pockets 324 to prevent rotation of ring 306 relative to ring 308 in rotational direction 336. Ring 306 is rotatable relative to ring 308 in rotational direction 337, opposite rotational direction 336.

Teeth 314 are engaged with teeth 318. Axial displacement of the dog clutch ring relative to ring 308 in axial direction 338 (ref. FIGS. 12A and 12B) engages teeth 314 with teeth 328 to lock rings 306 and 308, and the dog clutch ring together for cojoint rotation. Dog clutch with ratcheting one-way clutch 300 also includes springs 340. Each spring is arranged to urge a rocker into engagement with a pocket 324.

As can be seen in FIG. 11, for example, rotation of ring 306 relative to ring 308 in rotational direction 337 displaces the rockers (e.g., rocker 310A) to compress the springs (e.g., spring 340A). Therefore, rotation in direction 337 allows the rockers to slide in and out of engagement with pockets 324 but does not prevent rotation of ring 306 relative to ring 308, however. Conversely, due to the construction of pockets 324, when ring 306 is rotated in direction 336, the springs push the rockers into the pockets so that, once at least one rocker is fitted in a pocket, ring 306 is prevented from further rotating relative to ring 308. It should be noted that only one rocker need be disposed in a pocket 324 to prevent rotation and that rotational distribution of the rockers and a number of pockets 324 can be adjusted to limit an amount of rotation in direction 336 before a rocker is fully seated in a pocket 324.

Dog clutch with ratcheting one-way clutch 300 includes cover 342, fixed to ring 308 to axially retain the rockers in ring 308. Cover 342 may be fixed to ring 308 by press-fitting or staking, for example. Pockets 334 include cylindrical surfaces 344 and rockers include cylindrical surfaces 346 contacting surfaces 344 and protrusions 348 extending radially outward from surfaces 346 and arranged for selectively engaging pockets 324. Rockers 310 are arranged to rotate about respective rocker axes 350, parallel to axis 302, to engage pockets 324. As can best be seen in FIG. 11, pockets 324 each include a radially extending ramp 352. By radially extending, we mean that the ramp extends at least partially radially inward in rotational direction 336 (or radially outward in rotational direction 337), for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Dog clutch with ratcheting one-way clutch
102 Axis
104 Dog clutch ring
106 Ring (first)
108 Ring (second)
110 Rockers
110A Displaced rocker
112 Inner circumference (first)
114 Teeth (first)
116 Outer circumference (first)
118 Teeth (second)
120 Inner circumference (second)
122 Spline (first)
124 Pockets (first)
126 Outer circumference (second)
128 Teeth (third)
130 Inner circumference (third)
132 Spline (second)
134 Pockets (second)
136 Rotational direction (first)
137 Rotational direction (second)
138 Axial direction
140 Springs
140A Compressed spring
142 Cover
144 Cylindrical surfaces (first)
146 Cylindrical surfaces (second)
148 Protrusions
150 Rocker axes
152 Radially extending ramp
200 Dog clutch with ratcheting one-way clutch
202 Axis
204 Dog clutch ring
206 Ring (first)
208 Ring (second)
210 Rockers
212 Inner circumference (first)
214 Teeth (first)
216 Outer circumference (first)
218 Teeth (second)
220 Inner circumference (second)
222 Spline (first)
224 Pockets (first)
226 Outer circumference (second)
228 Teeth (third)
230 Inner circumference (third)
232 Spline (second)
234 Pockets (second)
236 Rotational direction (first)
237 Rotational direction (second)
238 Axial direction
240 Springs
242 Cover
243 Groove
248 Protrusions
250 Rocker axes
252 Axially extending ramp
300 Dog clutch with ratcheting one-way clutch
302 Axis
304 Dog clutch ring
306 Ring (first)
308 Ring (second)
310 Rockers
310A Displaced rocker
312 Inner circumference (first)
314 Teeth (first)
316 Outer circumference (first)
318 Teeth (second)
320 Inner circumference (second)
322 Spline (first)
324 Pockets (first)
326 Outer circumference (second)
328 Teeth (third)

330 Inner circumference (third)
332 Spline (second)
334 Pockets (second)
336 Rotational direction (first)
337 Rotational direction (second)
338 Axial direction
340 Springs
340A Compressed spring
342 Cover
344 Cylindrical surfaces (first)
346 Cylindrical surfaces (second)
348 Protrusions
350 Rocker axes
352 Radially extending ramp

What is claimed is:

1. A dog clutch with ratcheting one-way clutch, comprising:
    an axis;
    a dog clutch ring comprising a first inner circumference with a plurality of first teeth;
    a first ring, coaxial with the dog clutch ring, comprising:
        a first outer circumference with a plurality of second teeth, complementary to the first teeth;
        a second inner circumference with a first spline for receiving a first shaft; and
        a plurality of first pockets;
    a second ring, coaxial with the dog clutch ring, comprising:
        a second outer circumference with a plurality of third teeth, complementary to the first teeth;
        a third inner circumference with a second spline for receiving a second shaft; and
        a plurality of second pockets; and
    a plurality of rockers disposed in a one of the plurality of first pockets or the plurality of second pockets for selectively engaging with the other one of the plurality of first pockets or the plurality of second pockets to prevent rotation of the first ring relative to the second ring in only one rotational direction wherein:
        the plurality of first teeth is engaged with the plurality of second teeth; and
        the plurality of third teeth are aligned with the plurality of first teeth when rotation of the first ring relative to the second ring is prevented.

2. The dog clutch with ratcheting one-way clutch of claim 1 wherein:
    axial displacement of the dog clutch ring relative to the second ring engages the plurality of first teeth with the plurality of third teeth to lock the first ring, the second ring, and the dog clutch ring together for cojoint rotation.

3. The dog clutch with ratcheting one-way clutch of claim 1 further comprising a plurality of springs, wherein each one of the plurality of springs is arranged to urge a one of the plurality of rockers into engagement with a one of the other one of the plurality of first pockets or the plurality of second pockets.

4. The dog clutch with ratcheting one-way clutch of claim 3 wherein rotation of the first ring relative to the second ring in a second rotational direction, opposite the only one rotational direction, displaces the plurality of rockers to compress the springs.

5. The dog clutch with ratcheting one-way clutch of claim 1 further comprising a cover, fixed to a one of the first ring or the second ring, to axially retain the plurality of rockers in the one of the first ring or the second ring.

6. The dog clutch with ratcheting one-way clutch of claim 5 wherein the cover is fixed to the one of the first ring or the second ring by press-fitting or staking.

7. The dog clutch with ratcheting one-way clutch of claim 5 wherein the cover is a snap ring disposed in a groove of the one of the first ring or the second ring.

8. The dog clutch with ratcheting one-way clutch of claim 1 wherein the plurality of rockers is disposed in the plurality of first pockets.

9. The dog clutch with ratcheting one-way clutch of claim 8 wherein:
    each one of the plurality of first pockets comprises a first cylindrical surface; and
    each one of the plurality of rockers comprises:
        a second cylindrical surface contacting one of the first cylindrical surfaces; and
        a first protrusion extending radially outward from the second cylindrical surface and arranged for selectively engaging one of the plurality of second pockets.

10. The dog clutch with ratcheting one-way clutch of claim 9 wherein each one of the plurality of rockers is arranged to rotate about a respective rocker axis, parallel to the axis, to engage one of the plurality of second pockets.

11. The dog clutch with ratcheting one-way clutch of claim 10 wherein each one of the plurality of second pockets comprises a radially extending ramp.

12. The dog clutch with ratcheting one-way clutch of claim 8 wherein:
    each one of the plurality of first pockets comprises a T-shaped pocket;
    each one of the plurality of rockers comprises a T-shape and is arranged to fit within one of the T-shaped pockets; and
    the T-shape comprises a circumferentially extending base portion arranged for selectively engaging one of the plurality of second pockets.

13. The dog clutch with ratcheting one-way clutch of claim 12 wherein each one of the plurality of rockers is arranged to rotate about a respective rocker axis, normal to the axis, to engage one of the plurality of second pockets.

14. The dog clutch with ratcheting one-way clutch of claim 13 wherein each one of the plurality of second pockets comprises a circumferentially extending ramp.

15. The dog clutch with ratcheting one-way clutch of claim 1 wherein the plurality of rockers is disposed in the plurality of second pockets.

16. The dog clutch with ratcheting one-way clutch of claim 15 wherein:
    each one of the plurality of second pockets comprises a third cylindrical surface; and
    each one of the plurality of rockers comprises:
        a fourth cylindrical surface contacting one of the third cylindrical surfaces; and
        a second protrusion extending radially outward from the fourth cylindrical surface and arranged for selectively engaging one of the plurality of first pockets.

17. The dog clutch with ratcheting one-way clutch of claim 16 wherein each one of the plurality of rockers is arranged to rotate about a respective rocker axis, parallel to the axis, to engage a one of the plurality of first pockets.

18. The dog clutch with ratcheting one-way clutch of claim 17 wherein each one of the plurality of first pockets comprises a radially extending ramp.

* * * * *